US007043217B2

(12) United States Patent
Tanaka (10) Patent No.: US 7,043,217 B2
(45) Date of Patent: May 9, 2006

(54) COMBINING RECEPTION METHOD AND APPARATUS

(75) Inventor: Toyohisa Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 451 days.

(21) Appl. No.: 10/169,098

(22) PCT Filed: Dec. 4, 2000

(86) PCT No.: PCT/JP00/08554

§ 371 (c)(1),
(2), (4) Date: Jul. 12, 2002

(87) PCT Pub. No.: WO02/47289

PCT Pub. Date: Jun. 13, 2002

(65) Prior Publication Data
US 2003/0003890 A1    Jan. 2, 2003

(51) Int. Cl.
   *H04B 7/00*    (2006.01)
(52) U.S. Cl. .................. 455/273; 455/278.1; 455/562.1
(58) Field of Classification Search ................ 455/273, 455/278.1, 561, 562.1, 280, 296, 114.2, 63.1, 455/272; 342/378, 423, 373, 374, 434, 357.1, 342/381
   See application file for complete search history.

(56) References Cited

U.S. PATENT DOCUMENTS

| | | | |
|---|---|---|---|
| 5,566,168 A * | 10/1996 | Dent | 370/323 |
| 5,809,020 A | 9/1998 | Bruckert et al. | |
| 5,926,135 A * | 7/1999 | Minkoff | 342/379 |
| 5,940,452 A | 8/1999 | Rich | |
| 6,252,864 B1 * | 6/2001 | Hayashi | 370/335 |
| 6,385,181 B1 * | 5/2002 | Tsutsui et al. | 370/335 |

(Continued)

FOREIGN PATENT DOCUMENTS

JP    6-120856    4/1994

(Continued)

OTHER PUBLICATIONS

Shinya Tanaka et al.: "Pilot symbol-assisted decision-directed coherent adaptive array diversity for DS-CDMA radio reverse-link" IEICE Trans. Fundamentals, vol. E80-A, No. 12, pp. 2445-2453 Dec. 1997.

*Primary Examiner*—Sonny Trinh
(74) *Attorney, Agent, or Firm*—Oblon, Spivak, McClelland, Maier & Neustadt, P.C.

(57) ABSTRACT

A method and apparatus is provided for calculating possible values of a combination ratio for signals received via a plurality of antennas (A1 to An) according to different algorithms by means of a plurality of algorithm units (31 to 33), calculating an SIR value for each of a plurality of composite signals which are generated using the possible values, respectively (SIR calculation units (41 to 43)), determining which composite signal has the highest quality (determining unit (44)), and selecting the composite signal having the highest quality as a received signal (selecting unit (45)). Thus, since one composite signal with the highest quality is selected as the received signal from among the plurality of composite signals acquired according to the different algorithms, when the weight calculation according to either of the different algorithms becomes unstable or results in an erroneous convergence, the composite signal according to this algorithm is not selected and another composite signal according to another algorithm is selected. Accordingly, the weight calculation can be maintained with stability, and erroneous convergences of weights can be prevented.

22 Claims, 6 Drawing Sheets

U.S. PATENT DOCUMENTS

| | | | |
|---|---|---|---|
| 6,492,958 B1 * | 12/2002 | Yoshida | 343/853 |
| 6,628,698 B1 * | 9/2003 | Oda | 375/147 |
| 6,670,919 B1 * | 12/2003 | Yoshida | 342/378 |
| 6,771,689 B1 * | 8/2004 | Solondz | 375/144 |
| 6,784,923 B1 * | 8/2004 | August et al. | 348/180 |
| 2002/0061051 A1 * | 5/2002 | Kitahara | 375/144 |
| 2002/0141374 A1 * | 10/2002 | Boetzel et al. | 370/343 |
| 2002/0190900 A1 * | 12/2002 | Kimata et al. | 342/368 |
| 2003/0003890 A1 * | 1/2003 | Tanaka | 455/273 |
| 2003/0181222 A1 * | 9/2003 | Raddant | 455/562.1 |
| 2004/0043794 A1 * | 3/2004 | Nakaya et al. | 455/561 |

FOREIGN PATENT DOCUMENTS

| | | |
|---|---|---|
| JP | 9-260940 | 10/1997 |
| JP | 9-260941 | 10/1997 |
| JP | 10-051221 | 2/1998 |
| JP | 10-145130 | 5/1998 |
| JP | 11-234035 | 8/1999 |
| JP | 2000-78115 | 3/2000 |
| WO | WO 98/53560 | 11/1998 |

* cited by examiner

COMBINING RECEPTION METHOD AND APPARATUS

TECHNICAL FIELD

The present invention relates to a combining reception method of and apparatus for combining a plurality of signals received via a plurality of antennas with a variable combination ratio.

BACKGROUND ART

The application of an adaptive array antenna to mobile communication systems has been studied. An adaptive array antenna has already been put to practical use in base station apparatuses for PHS (Personal Handyphone System). In an adaptive array antenna, outputs from a plurality of antenna elements of the array are multiplied by respective weights (a combination ratio) and are then combined, so that interference waves are removed and a desired output is obtained. At this time, it is important to provide a set of appropriate weights according to a receiving environment in which the adaptive array antenna is placed. However, it is known that when the adaptive array antenna is placed in a communication environment with large variations in the reception level, in which fading or the like occurs, or when the directions from which a desired wave and an interference wave come are, nearly the same, the weight calculation becomes unstable or results in an erroneous convergence of the set of weights.

Japanese patent application publications No. 9-260941, No. 10-51221, No. 6-120856, No. 11-234035, etc. disclose conventional technology associated with the above-mentioned system.

Particularly, "Pilot Symbol-Assisted Decision-Directed Coherent Adaptive Array Diversity for DS-CDMA Mobile Radio Reverse Link", IEICE TRANS, Vol. E80-A, No. 12, December 1997 discloses an example of W-CDMA (Wideband Code Division Multiple Access) combining reception apparatuses which use an adaptive array antenna. The structure of the combining reception apparatus is shown in FIG. 5.

Figure 5:
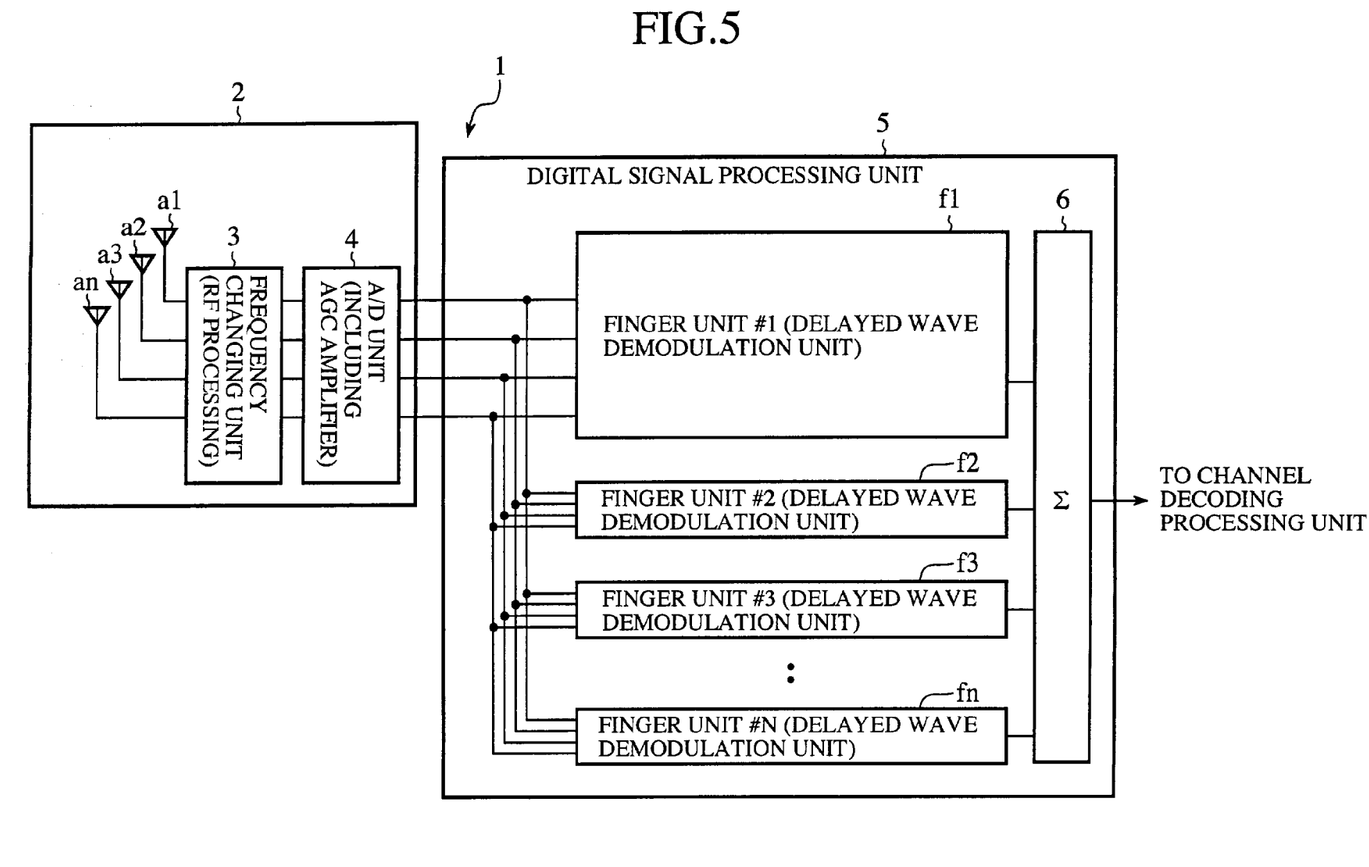
FIG. 5 is a block diagram showing an electrical structure of a prior art combining reception apparatus.

The combining reception apparatus 1 of FIG. 5 is provided with a common unit 2 and a digital signal processing unit (DSP) 5. The common unit 2 is provided with a plurality of antennas a1 to an each of which receives an incoming received wave, a frequency changing unit 3 for transforming high-frequency signals applied thereto into baseband signals, and an analog-to-digital (AD) conversion unit 4 for converting the analog signals into digital signals. The digital signal processing unit 5 is provided with a plurality of finger units f1 to fn each of which performs demodulation processing for each multipath and a multiplexer 6 for multiplexing signals output from the plurality of finger units f1 to fn into a single signal.

A received wave, which has come to the combining reception apparatus 1, is received by the antenna a1, is converted into a baseband signal by the frequency changing unit 3, is converted into a digital signal by the A/D unit 4, and is then input to the digital signal processing unit 5. The input signal is demodulated on a path-by-path basis by the plurality of finger units f1 to fn. Signals from the plurality of finger units f1 to fn are then multiplexed into a single signal by the multiplexer 6 and the signal is output to an external channel decoding processing unit not shown.

Figure 6:
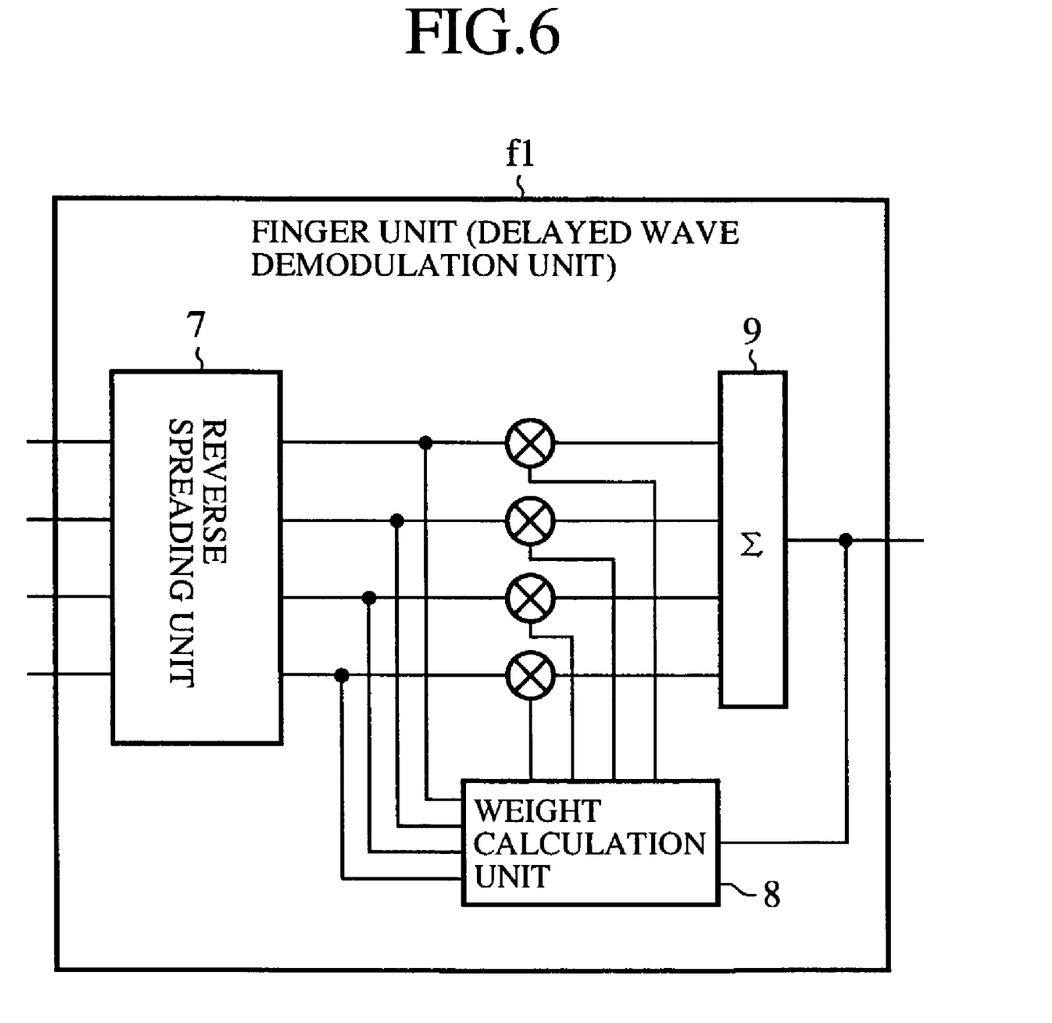
FIG. 6 is a block diagram showing a detailed electrical structure of a finger unit of FIG. 5.

FIG. 6 is a block diagram showing a detailed structure of the finger unit f1 of FIG. 5. The finger unit f1 is provided with a reverse spreading unit 7 for performing reverse spreading processing on the received signal from each of the plurality of antennas, a weight calculation unit 8 for calculating a set of weights from reverse-spread signals output from the reverse spreading unit 7, a plurality of multipliers each for multiplying a corresponding reverse-spread signal by a corresponding calculated weight, and a combining unit 9 for combining resultant signals from the plurality of multipliers into a single signal. The weight calculation unit 8 performs the weight calculation according to an interference removal algorithm, such as LMS (Least Mean Square), which is excellent at removing interference. The other finger units have the same structures as the finger unit f1.

The weight calculation unit 8 can calculate the set of weights having a directional characteristic which directs a null point in the direction of an interference wave by using the interference removal algorithm. Therefore, the plurality of finger units f1 to fn can output respective composite signals in each of which the interference wave is removed.

However, a problem with the prior art combining reception apparatus is that although it has a sufficient ability to remove interference waves by using the LMS algorithm, in a communication environment where the reception level varies greatly or when the directions from which a desired wave and an interference wave come are nearly the same, the convergence of the weight calculation may be extremely slowed down, the weight calculation may become unstable, and an erroneous convergence of the weight calculation may occur. When the weight calculation unit 8 uses an FFT (fast Fourier transform) algorithm or a maximal-ratio combining algorithm that provides a rapid convergence, the prior art combining reception apparatus cannot sufficiently remove interference waves, as a natural result.

DISCLOSURE OF THE INVENTION

It is an object of the present invention to provide a combining reception method and apparatus that can keep carrying out weight calculation with stability and can prevent any erroneous convergence of the weight calculation even in a communication environment where the reception level varies greatly or even when the directions from which a desired wave and an interference wave come are nearly the same.

In accordance with the present invention, there is provided a combining reception method of combining signals received via a plurality of antennas with a changeable combination ratio, the method comprising the steps of: calculating possible values of the combination ratio according to a plurality of algorithms; evaluating a quality of each of a plurality of composite signals respectively acquired with the possible values of the combination ratio; and determining which one of the plurality of composite signals has the highest quality and selecting the composite signal with the highest quality as a received signal.

In accordance with the present invention, since one composite signal with the highest quality is selected as the received signal from among the plurality of composite signals acquired by the different algorithms, when the weight calculation according to either of the different algorithms becomes unstable or results in an erroneous convergence, the composite signal according to this algorithm is not selected while another composite signal according to another algorithm is selected. Thus, since a composite signal with the highest quality is always selected as the received signal, the weight calculation can be maintained with stability and any erroneous convergence of weights can be prevented.

The method of the present invention is further characterized in that the evaluating step is the step of evaluating the quality of each of the plurality of composite signals by using a signal-interference ratio or SIR which is a ratio of an electric field strength of a desired wave and that of an interference wave.

In accordance with the present invention, any algorithm which cannot remove the interference wave is not selected while an algorithm which can remove the interference wave is selected because an SIR (Signal-Interference Ratio) is used for the quality evaluation of each composite signal. Therefore, an excellent interference wave removal characteristic can be provided.

The method of the present invention is also characterized in that each of the plurality of algorithms adaptively changes the generated possible value of the combination ratio, and the possible value of the combination ratio generated by one of the plurality of algorithms that offers a rapid convergence of combination ratio calculation is given as an initial value set of weights set to another one of the plurality of algorithms that offers a slow convergence of combination ratio calculation.

In accordance with the present invention, when even an algorithm poor in a certain characteristic (e.g., an interference wave removal characteristic or the like) provides a high convergence speed, it is possible to improve the convergence speed of another algorithm by using a possible value of the combination ratio calculated by the former algorithm as an initial value set of weights set to the other algorithm. Particularly, the present invention is extremely effective at capturing the received signal after shadowing happens when mobile terminal equipment temporarily moves behind a building or under a bridge.

The method of the present invention is further characterized in that each of the plurality of algorithms adaptively changes the generated possible value of the combination ratio, and when a composite signal generated according to an algorithm that offers a rapid convergence of combination ratio calculation has the highest quality, the possible value of the combination ratio generated by the algorithm that offers a rapid convergence of combination ratio calculation is given as an initial value set of weights set to another one of the plurality of algorithms that offers a slow convergence of combination ratio calculation.

In accordance with the present invention, when a composite signal generated according to an algorithm having a high convergence speed has the highest quality, it can be assumed that another algorithm that can originally provide a high quality results in an erroneous convergence, and the other algorithm can be then initialized using the possible value of the combination ratio generated by the algorithm that offers a rapid convergence. Accordingly, an erroneous convergence of weights can be prevented, and convergence by the algorithm that can generate a composite signal of a higher quality can be also accelerated.

The method of the present invention is also characterized in that it further comprises the steps of spatially separating the signals received via the plurality of antennas into a plurality of groups of signals corresponding to directions of a predetermined plurality of fixed beams, detecting a direction of a path of a received wave by using the separated plurality of groups of signals, using a combination ratio that shows a directional characteristic associated with the detected direction of the path as an initial value set of weights set to each of the plurality of algorithms, and, after that, adaptively calculating the possible values of the combination ratio according to the plurality of algorithms.

In accordance with the present invention, since by detecting the direction of the path of the received wave using the spatially separated groups of signals, it is possible to exclusively use frequencies for each separated signal and to provide the user with all frequency bands for the direction of each fixed beam. Furthermore, since the path detection is carried out in the limited beam direction, the amount of interference can be reduced and even a path with a low reception level can be found.

In accordance with another aspect of the present invention, there is provided a combining reception apparatus for combining signals received via a plurality of antennas with a changeable combination ratio, the apparatus comprising a combination ratio calculating unit for calculating possible values of the combination ratio according to a plurality of algorithms; an evaluating unit for evaluating a quality of each of a plurality of composite signals respectively acquired with the possible values of the combination ratio; a determining unit for determining which one of the plurality of composite signals has the highest quality; and a selecting unit for selecting the composite signal with the highest quality as a received signal.

In accordance with the present invention, since one composite signal with the highest quality is selected as the received signal from among the plurality of composite signals acquired by the different algorithms, when the weight calculation according to either of the different algorithms becomes unstable or results in an erroneous convergence, the composite signal according to this algorithm is not selected while another composite signal according to another algorithm is selected. Thus, since the composite signal with the highest quality is always selected as the received signal, the weight calculation can be maintained with stability and an erroneous convergence of weights can be prevented.

BEST MODE FOR CARRYING OUT THE INVENTION

Hereafter, a preferred embodiment of the present invention will be explained with reference to the accompanied drawings.

Figure 1:
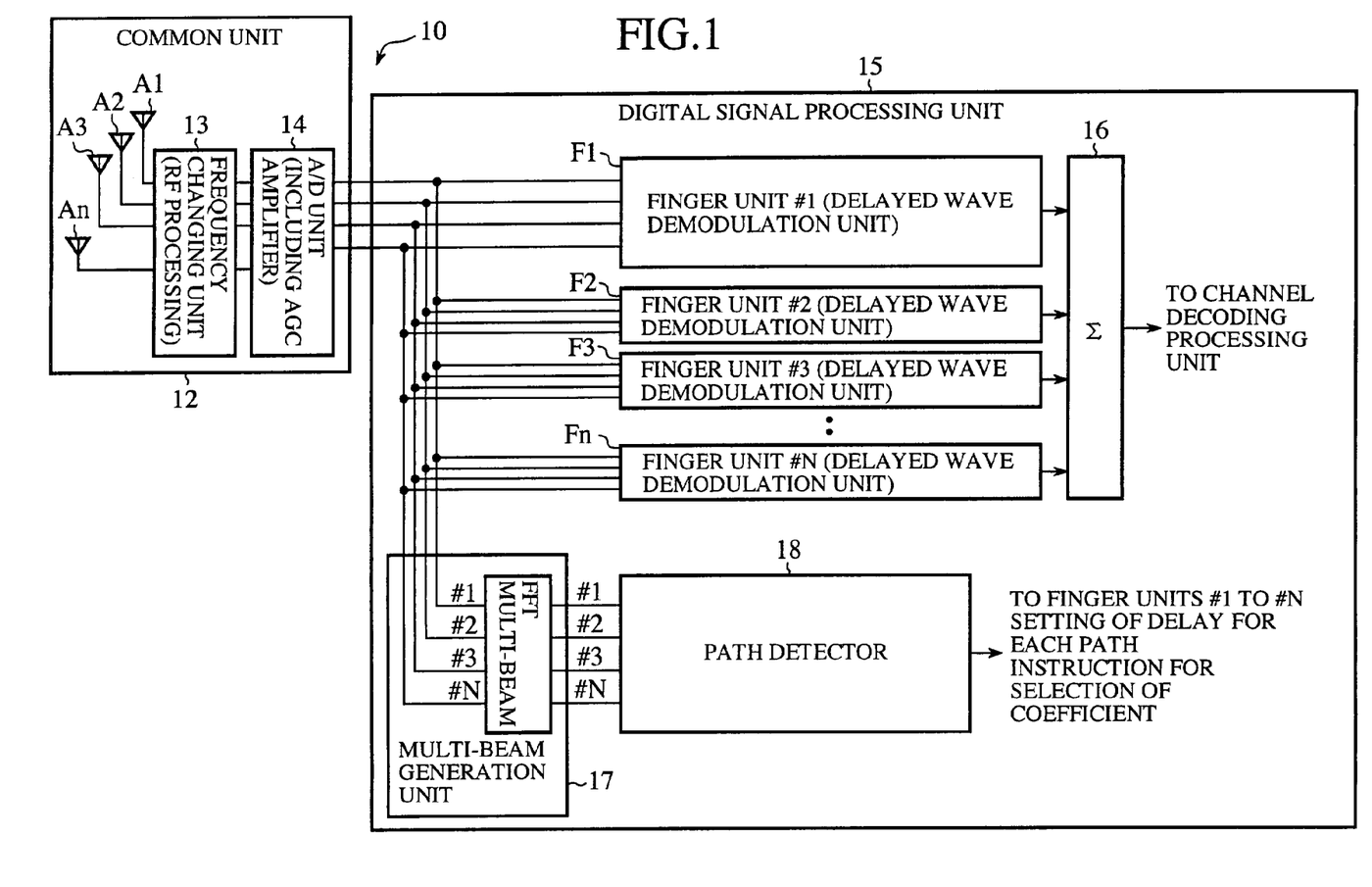
FIG. 1 is a block diagram showing an electrical structure of a combining reception apparatus according to an embodiment of the present invention.

FIG. 1 is a block diagram showing an electrical structure of a combining reception apparatus according to an embodiment of the present invention. The combining reception apparatus 10 is provided with a common unit 12 and a digital signal processing unit (DSP) 15. The common unit 12 is provided with a plurality of antennas A1 to An each of which receives an incoming received wave, a frequency changing unit 13 for transforming high-frequency signals applied thereto into baseband signals, and an analog-to-digital (AD) conversion unit 14 for amplifying the baseband signals from the frequency changing unit 13 with a changeable gain so that they have appropriate signal levels, and for converting the amplified analog signals to digital signals.

The digital signal processing unit 15 is provided with a multi-beam generation unit 17 for generating fixed beams using FFT (fast Fourier transformation), a path detector 18 for measuring a delay time of an incoming wave, which is to be demodulated, for each fixed beam, a plurality of finger units F1 to Fn each for performing demodulation processing for each path detected based on information from the path detector 18, and a multiplexer 16 for multiplexing signals output from the plurality of finger units F1 to Fn into a single signal. The combining reception apparatus 10 can have a number of digital signal processing units in parallel for a number of channels to be demodulated though only one digital signal processing unit 15 is illustrated in FIG. 1. The number of beams generated by the multi-beam generation unit 17 is determined according to the number of antenna elements, and the number of beams therefore increases with an increase in the number of antenna elements.

Figure 2:
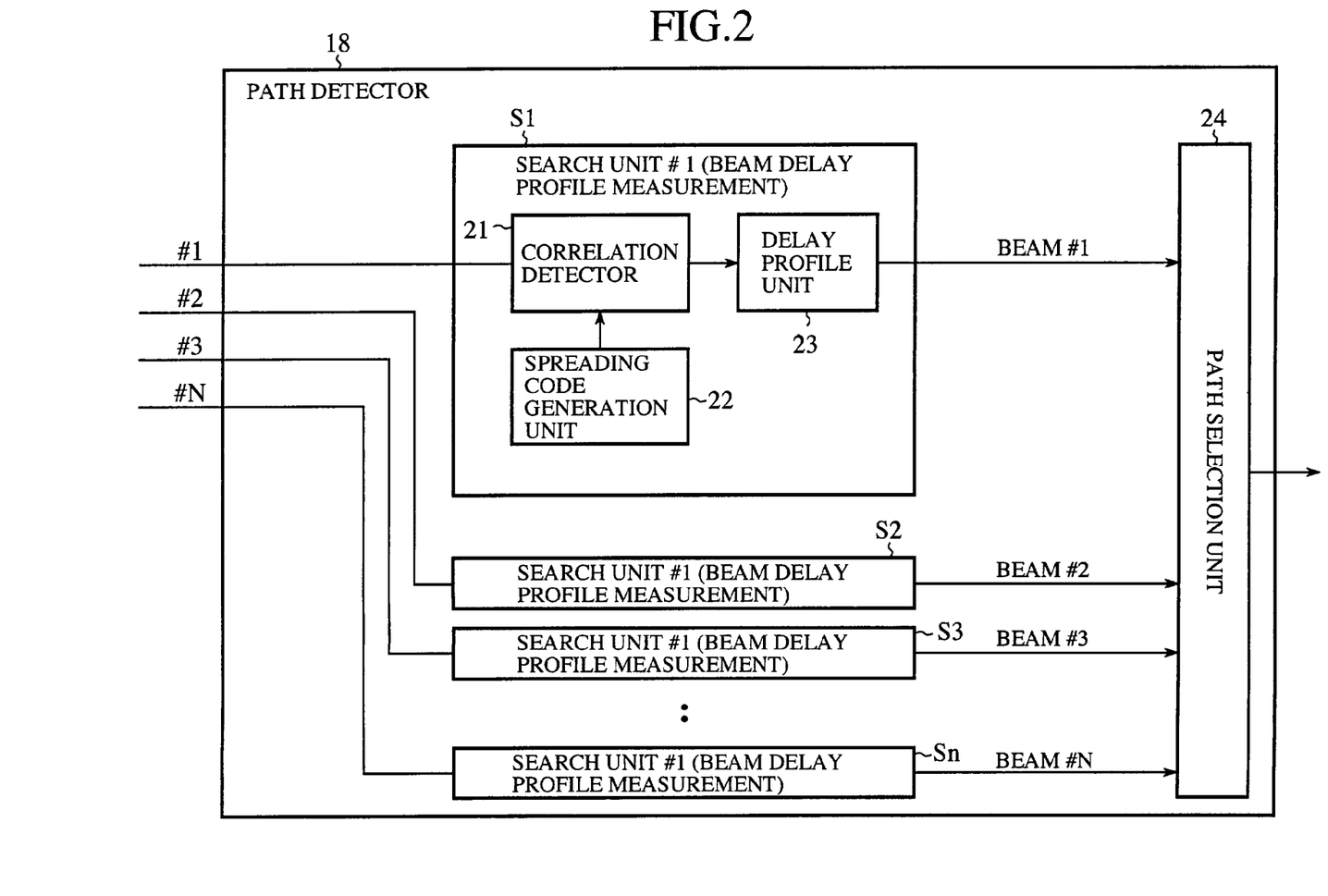
FIG. 2 is a block diagram showing a detailed electrical structure of a path detector of FIG. 1.

FIG. 2 is a block diagram showing a detailed electrical structure of the path detector of FIG. 1. The path detector 18 is provided with a plurality of search units S1 to Sn each for measuring a delay time of a corresponding beam generated by the multi-beam generation unit 17 and a path selection unit 24 for selecting an appropriate path via which the received wave has come based on information acquired by the plurality of search units S1 to Sn. The search unit S1 is provided with a correlation detector 21 that reverse-spreads the generated beam applied thereto according to a spreading code and that performs correlation detection, a spreading code generation unit 22 for generating the spreading code, and a delay profile unit 23 for measuring a delay time. The other search units have the same structures as the finger unit F1.

Since the combining reception apparatus according to this embodiment thus detects an incoming wave and measures the time of arrival of the incoming wave for each beam spatially separated by the multi-beam generation unit 17, the combining reception apparatus can exclusively use frequencies for the separated signal and can provide the user with all frequency bands for the direction of each fixed beam. Furthermore, since path detection is carried out in the limited beam direction, the amount of interference can be reduced and even a path with a low reception level can be found.

Figure 3:
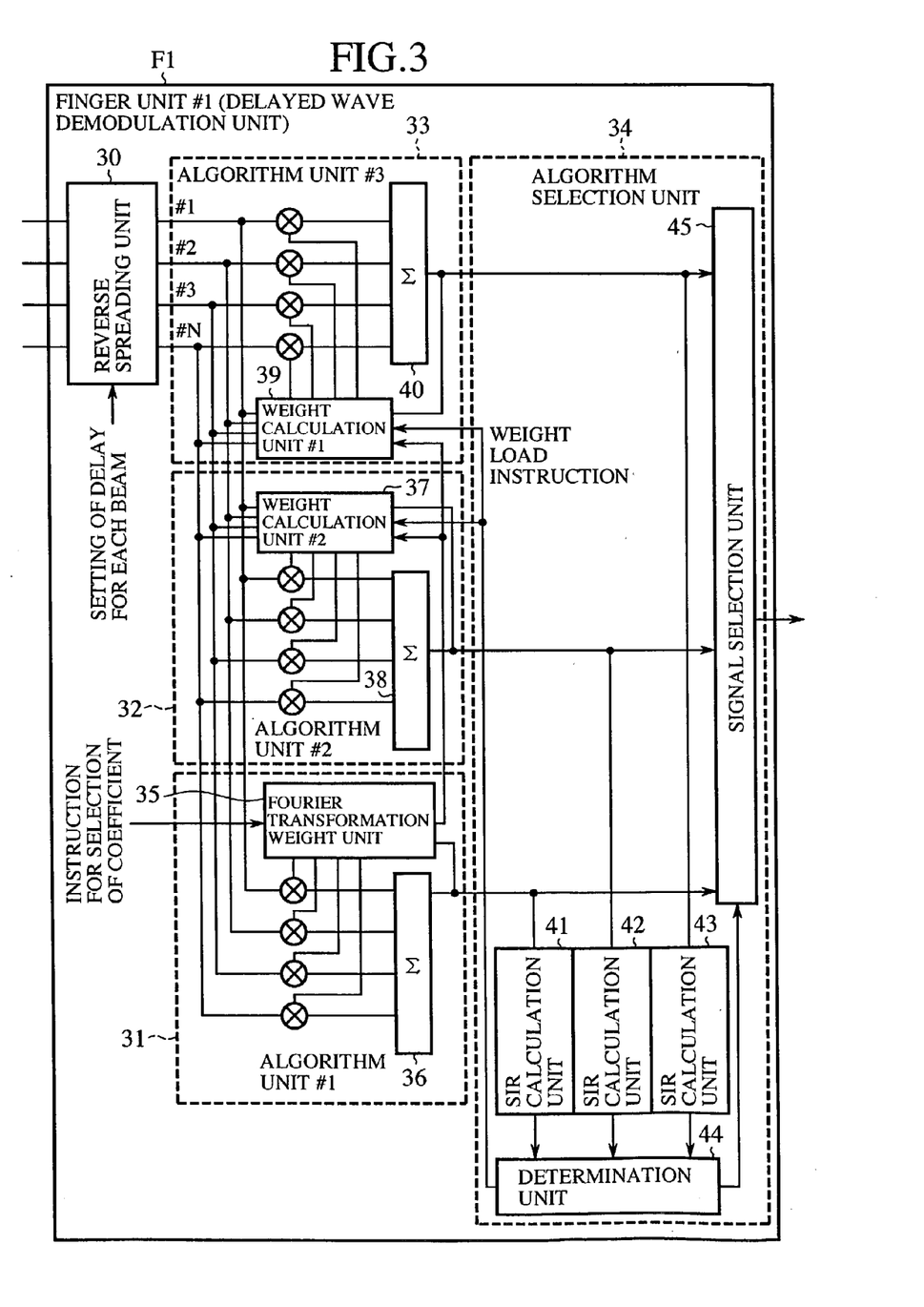
FIG. 3 is a block diagram showing a detailed electrical structure of a finger unit of FIG. 1.

FIG. 3 is a block diagram showing a detailed electrical structure of the finger unit F1 of FIG. 1. The finger unit F1 is provided with a reverse spreading unit 30 for performing reverse spreading processing on a signal from each of the plurality of antennas, a plurality of algorithm units 31 to 33 for processing reverse-spread signals, and an algorithm selection unit 34 for selecting one output from among outputs of the plurality of algorithm units 31 to 33. The other finger units have the same structures as the finger unit F1.

The first algorithm unit (#1) 31 is provided with a Fourier transformation weight unit (#1) 35 for retrieving a set of coefficients, i.e., weights corresponding to the direction from which the incoming wave has come, which is notified by the path detector 18 of FIG. 1, from a table, a plurality of multipliers each for multiplying a corresponding reverse-spread signal by a corresponding retrieved weight, and a combining unit 36 for combining signals multiplied by weights from the plurality of multipliers. The first algorithm unit (#1) 31 thus performs demodulation processing on the plurality of fixed beams. The Fourier transformation weight unit (#1) 35 can uniquely determine the set of weights from the result of path detection.

The second algorithm unit (#2) 32 is provided with a weight calculation unit (#2) 37 for calculating a set of weights from the plurality of reverse-spread signals from the reverse spreading unit 30, a plurality of multipliers each for multiplying a corresponding reverse-spread signal by a corresponding calculated weight, and a combining unit 38 for combining signals multiplied by calculated weights from the plurality of multipliers. The weight calculation unit (#2) 37 adaptively calculates the set of weights for the plurality of reverse-spread signals by using a maximal-ratio combining algorithm that maximizes an SNR (Signal-Noise Ratio) which is the ratio of the electric power of a desired wave and thermal noise.

The third algorithm unit (#3) 33 is constructed in the same way that the second algorithm unit (#2) 32 is constructed, and is provided with a weight calculation unit (#3) 39, a plurality of multipliers, and a combining unit 40. The weight calculation unit (#3) 39 adaptively calculates a set of weights for the plurality of reverse-spread signals by using an interference removal algorithm, such as LMS (Least Mean Square) or RLS (Recursive Least mean Square), which is excellent at removing interference. The weight calculation unit (#3) 39 directs the weight calculation toward the desired wave by using an already-known reference signal so as to remove the interference wave.

The algorithm selection unit 34 is provided with a plurality of SIR calculation units 41 to 43 for calculating SIRs (Signal Interference Ratios) from outputs of the plurality of algorithm units 31 to 33, respectively, a determination unit 44 for determining the largest one from among the calculated SIRs and for providing an instruction of weight load to the weight calculation units 37 and 39 based on the determination result, and a signal selection unit 45 for selecting the output of the algorithm unit which has calculated the largest SIR based on the determination result from the determination unit 44. Those SIR calculation units 41 to 43 evaluate the qualities of composite signals by calculating their respective SIRs, and the determination unit 44 determines one composite signal with the highest quality by determining which one of the outputs of the plurality of algorithm units 31 to 33 has the largest SIR.

Thus, in accordance with this embodiment, since the combining reception apparatus selects one composite signal with the highest quality as the received signal from among a plurality of composite signals acquired by the plurality of different algorithm units which perform processing independently, when the weight calculation by the algorithm unit (#3) 33 becomes unstable or results in an erroneous convergence of the set of weights, for example, the composite signal generated by the algorithm unit (#3) 33 is not selected while the composite signal generated by one (#1 or #2) of the other algorithm units is selected. Thus the whole of the plurality of finger units can continue the weight calculation with stability, and can prevent any erroneous convergence of the set of weights.

Furthermore, in this embodiment, since SIRs are used for an evaluation of the quality of each generated composite signal, any algorithm unit which cannot remove the interference wave is not selected while another algorithm unit which can remove the interference wave is selected. Therefore, an excellent interference wave removal characteristic can be provided.

In this embodiment, three algorithm units are used. As an alternative, two, four or more algorithm units can be arranged in parallel.

Figure 4:
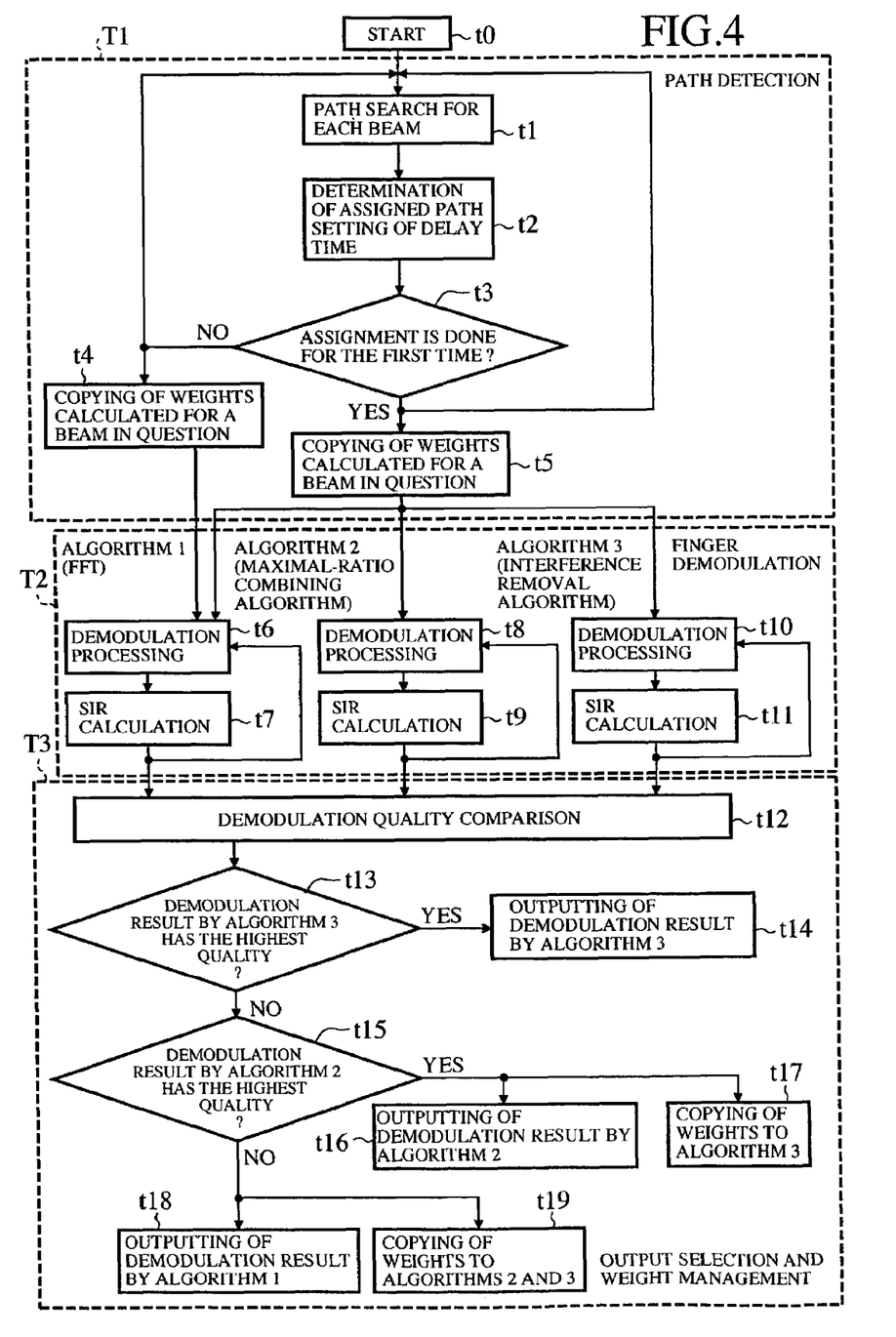
FIG. 4 is a flowchart showing a flow of processing performed by the combining reception apparatus of FIG. 1.

FIG. 4 is a flowchart showing a flow of processing performed by the combining reception apparatus of FIG. 1. The combining reception processing is roughly divided into path detection T1, finger demodulation T2 and output selection and weight management T3. The path detection T1 is carried out by the path detector 18 (see FIG. 2). The finger demodulation T2 and the output selection and weight management T3 are carried out by the plurality of finger units F1 to Fn (see FIG. 3).

When the combining reception apparatus starts the combining reception processing in step t0, the combining reception apparatus, in next step t1, performs the path detection and the measurement of a delay time for each beam. The combining reception apparatus then, in step t2, determines an assigned path and sets the delay time. Next, the combining reception apparatus, in step t3, determines whether or not the path assignment has been done for the first time. When the combining reception apparatus determines that the path assignment has been done for the first time, the combining reception apparatus, in step t5, copies a set of weights calculated for each beam in question to the Fourier transformation weight unit 35 and the weight calculation units 37 and 39. In contrast, when the combining reception apparatus determines that the path assignment has not been done for the first time, the combining reception apparatus, in step t4, copies the set of weights calculated for each beam in question to only the Fourier transformation weight unit (#1) 35.

The combining reception apparatus repeatedly performs the demodulation processing and the SIR calculation by means of the first algorithm unit #1 by repeating steps t6 and t7. Similarly, the combining reception apparatus repeatedly performs the demodulation processing and the SIR calculation by means of the second algorithm unit #2 by repeating steps t8 and t9, and the combining reception apparatus repeatedly performs the demodulation processing and the SIR calculation by means of the third algorithm unit #3 by repeating steps t10 and t11.

The combining reception apparatus, in step t12, performs a comparison among the qualities of composite signals output from the three algorithm units #1 to #3, that is, among their SIR values. The combining reception apparatus then, in step t13, determines whether a composite signal from the third algorithm unit #3 has the highest quality, that is, the largest SIR value. When the composite signal from the third algorithm unit #3 has the highest quality, the combining reception apparatus, in step t14, selectively outputs the composite signal from the third algorithm unit #3 as a demodulation result. When the composite signal from the third algorithm unit #3 does not have the highest quality, the combining reception apparatus advances to next step t15.

The combining reception apparatus then, in step t15, determines whether a composite signal from the second algorithm unit #2 has the highest quality, that is, the largest SIR value. When the composite signal from the second algorithm unit #2 has the highest quality, the combining reception apparatus, in step t16, selectively outputs the composite signal from the second algorithm unit #2 as the demodulation result and, in step t17, simultaneously copies the set of weights calculated by the second algorithm unit #2 to the third algorithm unit #3. When the composite signal from the second algorithm unit #2 does not has the highest quality, that is, when a composite signal from the first algorithm unit #1 has the highest quality, the combining reception apparatus, in step t18, selectively outputs the composite signal from the first algorithm unit #1 as the demodulation result and, in step t19, simultaneously copies the set of weights calculated by the first algorithm unit #1 to the second and third algorithm units #2 and #3.

The above-mentioned combining reception processing is summarized as follows. The combining reception apparatus measures a delay profile for each multi-beam (i.e., each FFT beam) output by means of the path detector while the combining reception apparatus is placed in an initial operating state. The combining reception apparatus then assigns a detected path to each finger unit. At this time, the combining reception apparatus sets a set of weights calculated for FFT beams as an initial value set of weights set to the algorithm units #2 and #3 so as to speed up the convergence of weights according to the algorithm units #2 and #3. After that, the combining reception apparatus carries out the three demodulation processes in parallel according to the three algorithms and then selects the best result by using SIR values as a measure of the evaluation of the qualities of composite signals generated according to the three algorithms.

The weight coping processing in steps t17 and t19 is carried out according to a weight load instruction provided by the determination unit 44. Furthermore, in FIG. 4, after the second algorithm unit #2 converges, the combining reception apparatus copies the set of weights calculated by the second algorithm unit #2 to the third algorithm unit #3. As an alternative, the third algorithm unit #3 can use the set of weights calculated for FFT beams from the beginning.

The combining reception apparatus selects a result with the best reception quality by using SIR values which are calculated based on the demodulation result from each algorithm unit, as in the case of the initial operating state, and determines data to be passed to a next stage, such as a channel decoding unit, from the result.

Thus, in accordance with this embodiment, since the set of weights calculated by the first algorithm unit #1 that has an inferior interference wave removal characteristic, but provides a high convergence speed can be used as an initial value set of weights set to another algorithm unit (#2 or #3), the convergence speed of the other algorithm unit (#2 or #3) can be increased.

In addition, in accordance with the present embodiment, when a composite signal generated by the first algorithm unit #1 with a high convergence speed has the highest quality, it can be assumed that the third algorithm unit #3 that can originally provide a high quality produces an erroneous convergence, and the third algorithm unit #3 can be then initialized using the set of weights generated by the first algorithm unit #1 that offers a rapid convergence. Accordingly, the combining reception apparatus can prevent the third algorithm unit #3 from producing an erroneous convergence of weights, thereby preventing itself from lapsing into a state in which it cannot perform demodulation. The combining reception apparatus can also permit the third algorithm unit #3 that can generate a composite signal of a higher quality to accelerate convergence.

INDUSTRIAL APPLICABILITY

The communication apparatus according to the present invention is applicable to radio communications systems such as CDMA systems.

The invention claimed is:

1. A combining reception method of combining signals received by a plurality of antennas with a changeable combination ratio, said method comprising:
    calculating possible values of said combination ratio according to a plurality of algorithms;
    evaluating a quality of each of a plurality of composite signals respectively acquired with the possible values of said combination ratio; and
    determining which one of the plurality of composite signals has a highest quality and selecting the composite signal with the highest quality as a received signal.

2. The combining reception method according to claim 1, wherein said evaluating evaluates the quality of each of the plurality of composite signals by using a signal-interference ratio or SIR which is a ratio of an electric power of a desired wave and that of an interference wave.

3. The combining reception method according to claim 2, wherein each of said plurality of algorithms adaptively changes the generated possible value of said combination ratio, and the possible value of said combination ratio generated by one of said plurality of algorithms that offers a rapid convergence of combination ratio calculation is given as an initial value set to another one of said plurality of algorithms that offers a slow convergence of combination ratio calculation.

4. The combining reception method according to claim 3, further comprising:
    spatially separating the received signals into a plurality of groups of signals corresponding to directions of a predetermined plurality of fixed beams;
    detecting a direction of a path of a received wave by using the separated plurality of groups of signals;
    using a combination ratio that shows a directional characteristic associated with the detected direction of the path as an initial value set to each of said plurality of algorithms; and
    subsequently adaptively calculating the possible values of said combination ratio according to said plurality of algorithms.

5. The combining reception method according to claim 2, wherein each of said plurality of algorithms adaptively changes the generated possible value of said combination ratio, and when a composite signal generated according to an algorithm that offers a rapid convergence of combination ratio calculation has the highest quality, the possible value of said combination ratio generated by said algorithm that offers a rapid convergence of combination ratio calculation is given as an initial value set to another one of said plurality of algorithms that offers a slow convergence of combination ratio calculation.

6. The combining reception method according to claim 5, further comprising:
    spatially separating the received signals into a plurality of groups of signals corresponding to directions of a predetermined plurality of fixed beams;
    detecting a direction of a path of a received wave by using the separated plurality of groups of signals;
    using a combination ratio that shows a directional characteristic associated with the detected direction of the path as an initial value set to each of said plurality of algorithms; and
    subsequently adaptively calculating the possible values of said combination ratio according to said plurality of algorithms.

7. The combining reception method according to claim 2, further comprising:
    spatially separating the received signals into a plurality of groups of signals corresponding to directions of a predetermined plurality of fixed beams;
    detecting a direction of a path of a received wave by using the separated plurality of groups of signals;
    using a combination ratio that shows a directional characteristic associated with the detected direction of the path as an initial value set to each of said plurality of algorithms; and
    subsequently adaptively calculating the possible values of said combination ratio according to said plurality of algorithms.

8. The combining reception method according to claim 1, wherein each of said plurality of algorithms adaptively changes the generated possible value of said combination ratio, and the possible value of said combination ratio generated by one of said plurality of algorithms that offers a rapid convergence of combination ratio calculation is given as an initial value set to another one of said plurality of algorithms that offers a slow convergence of combination ratio calculation.

9. The combining reception method according to claim 8, further comprising:
    spatially separating the received signals into a plurality of groups of signals corresponding to directions of a predetermined plurality of fixed beams;
    detecting a direction of a path of a received wave by using the separated plurality of groups of signals;
    using a combination ratio that shows a directional characteristic associated with the detected direction of the path as an initial value set to each of said plurality of algorithms; and
    subsequently adaptively calculating the possible values of said combination ratio according to said plurality of algorithms.

10. The combining reception method according to claim 7, wherein each of said plurality of algorithms adaptively changes the generated possible value of said combination ratio, and when a composite signal generated according to an algorithm that offers a rapid convergence of combination ratio calculation has the highest quality, the possible value of said combination ratio generated by said algorithm that offers a rapid convergence of combination ratio calculation is given as an initial value set to another one of said plurality of algorithms that offers a slow convergence of combination ratio calculation.

11. The combining reception method according to claim 10, further comprising:
    spatially separating the received signals into a plurality of groups of signals corresponding to directions of a predetermined plurality of fixed beams;
    detecting a direction of a path of a received wave by using the separated plurality of groups of signals;
    using a combination ratio that shows a directional characteristic associated with the detected direction of the path as an initial value set to each of said plurality of algorithms; and
    subsequently adaptively calculating the possible values of said combination ratio according to said plurality of algorithms.

12. The combining reception method according to claim 1, further comprising:
    spatially separating the received signals into a plurality of groups of signals corresponding to directions of a predetermined plurality of fixed beams;
    detecting a direction of a path of a received wave by using the separated plurality of groups of signals;

using a combination ratio that shows a directional characteristic associated with the detected direction of the path as an initial value set to each of said plurality of algorithms; and
subsequently adaptively calculating the possible values of said combination ratio according to said plurality of algorithms.

13. The combining reception method according to claim 1, further comprising:
generating the plurality of composite signals based on the possible values of the combination ratio.

14. A combining reception apparatus for combining signals received by a plurality of antennas with a changeable combination ratio, said apparatus comprising:
a combination ratio calculating means for calculating possible values of said combination ratio according to a plurality of algorithms;
an evaluating means for evaluating a quality of each of a plurality of composite signals respectively acquired with the possible values of said combination ratio;
a determining means for determining which one of the plurality of composite signals has a highest quality; and
a selecting means for selecting the composite signal with the highest quality as a received signal.

15. The combining reception apparatus according to claim 14, further comprising:
means for generating the plurality of composite signals based on the possible values of the combination ratio.

16. A combining reception method of combining signals received by a plurality of antennas with a changeable combination ratio, said method comprising:
calculating possible values of said combination ratio according to a plurality of algorithms;
evaluating a quality of each of a plurality of composite signals respectively acquired with the possible values of said combination ratio; and
determining which one of the plurality of composite signals has a highest quality and selecting the composite signal with the highest quality as a received signal,
wherein each of said plurality of algorithms adaptively changes the generated possible value of said combination ratio, and the possible value of said combination ratio generated by one of said plurality of algorithms that offers a rapid convergence of combination ratio calculation is given as an initial value set to another one of said plurality of algorithms that offers a slow convergence of combination ratio calculation.

17. The combining reception method according to claim 16, wherein said evaluating evaluates the quality of each of the plurality of composite signals by using a signal-interference ratio or SIR which is a ratio of an electric power of a desired wave and that of an interference wave.

18. The combining reception method according to claim 16, further comprising:
spatially separating the received signals into a plurality of groups of signals corresponding to directions of a predetermined plurality of fixed beams;
detecting a direction of a path of a received wave by using the separated plurality of groups of signals;
using a combination ratio that shows a directional characteristic associated with the detected direction of the path as an initial value set to each of said plurality of algorithms; and
subsequently adaptively calculating the possible values of said combination ratio according to said plurality of algorithms.

19. A combining reception method of combining signals received by a plurality of antennas with a changeable combination ratio, said method comprising:
calculating possible values of said combination ratio according to a plurality of algorithms;
evaluating a quality of each of a plurality of composite signals respectively acquired with the possible values of said combination ratio; and
determining which one of the plurality of composite signals has a highest quality and selecting the composite signal with the highest quality as a received signal,
wherein each of said plurality of algorithms adaptively changes the generated possible value of said combination ratio, and when a composite signal generated according to an algorithm that offers a rapid convergence of combination ratio calculation has the highest quality, the possible value of said combination ratio generated by said algorithm that offers a rapid convergence of combination ratio calculation is given as an initial value set to another one of said plurality of algorithms that offers a slow convergence of combination ratio calculation.

20. The combining reception method according to claim 19, wherein said evaluating evaluates the quality of each of the plurality of composite signals by using a signal-interference ratio or SIR which is a ratio of an electric power of a desired wave and that of an interference wave.

21. The combining reception method according to claim 19, further comprising:
spatially separating the received signals into a plurality of groups of signals corresponding to directions of a predetermined plurality of fixed beams;
detecting a direction of a path of a received wave by using the separated plurality of groups of signals;
using a combination ratio that shows a directional characteristic associated with the detected direction of the path as an initial value set to each of said plurality of algorithms; and
subsequently adaptively calculating the possible values of said combination ratio according to said plurality of algorithms.

22. A combining reception method of combining signals received by a plurality of antennas with a changeable combination ratio, said method comprising:
calculating possible values of said combination ratio according to a plurality of algorithms;
evaluating a quality of each of a plurality of composite signals respectively acquired with the possible values of said combination ratio;
determining which one of the plurality of composite signals has a highest quality and selecting the composite signal with the highest quality as a received signal;
spatially separating the received signals into a plurality of groups of signals corresponding to directions of a predetermined plurality of fixed beams;
detecting a direction of a path of a received wave by using the separated plurality of groups of signals;
using a combination ratio that shows a directional characteristic associated with the detected direction of the path as an initial value set to each of said plurality of algorithms; and
subsequently adaptively calculating the possible values of said combination ratio according to said plurality of algorithms.

* * * * *